United States Patent [19]

Rutledge

[11] Patent Number: 4,494,290
[45] Date of Patent: Jan. 22, 1985

[54] SPLIT BUSHING AND TOOL KIT

[76] Inventor: Seth E. Rutledge, P.O. Box 3311, St. Petersburg, Fla. 33731

[21] Appl. No.: 328,679

[22] Filed: Dec. 8, 1981

[51] Int. Cl.³ ............. B25B 27/14; B25B 9/02; F16C 33/04
[52] U.S. Cl. ............. 29/280; 188/239; 294/100; 384/281; 384/295
[58] Field of Search .......... 294/15, 16, 33, 100, 294/99 R; 29/278, 280, 282, 402.08; 81/43; 188/329, 330, 332, 338, 339; 308/237 R, 238, 58, 71; 384/276, 280, 281, 295, 297

[56] References Cited

U.S. PATENT DOCUMENTS

| | | | |
|---|---|---|---|
| 1,384,289 | 7/1921 | Wilson | 29/280 |
| 1,461,554 | 7/1923 | Raffay | 29/280 |
| 2,576,235 | 11/1951 | Nelson | 294/100 X |
| 2,851,314 | 9/1958 | Thomson | 308/71 X |
| 3,279,569 | 10/1966 | Kieser et al. | 188/330 X |
| 3,316,949 | 5/1967 | Canfield | 294/100 X |

Primary Examiner—Stuart S. Levy
Assistant Examiner—David J. Werner
Attorney, Agent, or Firm—Harvey B. Jacobson

[57] ABSTRACT

A cut or split bushing having a set of holes or apertures along one or both sides of the bushing for receiving pinching finger elements of a tool. By this structure, one is capable of grasping the bushing at its apertures for axial insertion into or axial removal from a bushing sleeve or boss formed in a support housing for camshaft having the S-cam on one end and a torque arm on the other in a truck brake system. The tool has a resilient arcuate handle grasping portion that applies a spring or resilient action upon the pinching finger elements, the force thereof being such to bias the fingers apart so that one's hand normally forces the fingers together. The fingers may be retained together by a clamping band retaining the fingers in a pinching position so that the bushing may be withdrawn from the supporting housing or journal block which supports the shaft that extends through the bushing.

2 Claims, 3 Drawing Figures 4,494,290

SPLIT BUSHING AND TOOL KIT

BACKGROUND OF THE INVENTION

The present invention relates to a split bushing and a tool assembled in a kit assembly, and more particularly the invention relates to a bushing having a split cut therethrough so that it may be opened wide for lateral application onto or removal from a shaft, and a tool having pinching finger elements insertable into pinching finger openings in an end of the bushing for inserting the bushing axially into a bushing or bearing sleeve or boss or axially removing the bushing.

FIELD OF THE INVENTION

In maintenance and repair or replacement of bearings or bushing in brake assemblies for trucks, trailers and other type vehicles, it would be desirable to replace them without disassembly of the entire brake assembly and without removal of an S-head cam and shaft on which there are one or more bushings mounted within bushing sleeves or bosses. By means and the method of the present invention, it is possible to withdraw a bushing from a bearing sleeve or boss without disassembly of the S-head cam and shaft from the brake assembly. By allowing the shaft to remain in place, and by use of the tool, the bushing is conveniently secured by the tool and the bushing is withdrawn from the sleeve or boss hole so that when it is disposed at an intermediate portion of the camshaft, it is adaptable to being withdrawn from the shaft by laterally passing the shaft through a split cut in the bushing. The tool may be retained securely and fixedly into or onto the bushing by the fingers being placed within the openings and held in place by the clamp band retaining the fingers in pinching relation with the bushing.

SUMMARY OF THE INVENTION

It is an object and an advantage of the present invention to provide a new split bushing structure of generally resilient material such that the bushing may be laterally removed from or assembled onto a shaft and a tool that facilitates axial insertion and removal of the bushing into a bushing sleeve or boss.

Another and additional advantage of the present invention is to provide a new tool having pinching finger elements that are positionable into pinching finger receiving openings in an end of the bushing so that when the tool is placed in a set of the openings, it may be readily inserted into or withdrawn from a bushing sleeve or boss.

Another and further advantage of the present invention is to provide a split bushing and tool kit assembly such that when they are used together, it is advantageous and possible to replace and install a split bushing onto an S-head cam shaft without the entire disassembly thereof and the tool aids in the installation of the split bushing onto the brake assembly.

Yet a further advantage of the present invention is that it provides for a simple, inexpensive and uniquely constructed arrangement of a split bushing and tool kit assembly not known nor available within the present state of the art.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
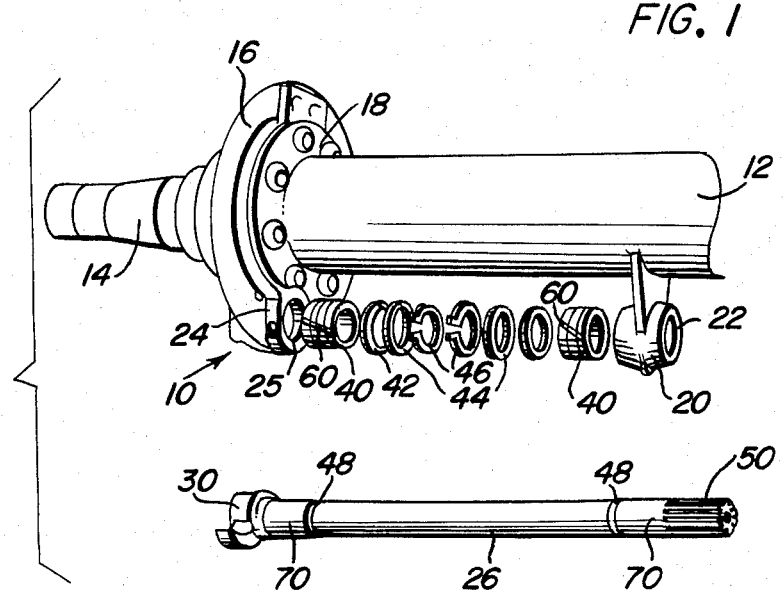
FIG. 1 is a perspective view, a portion illustrating an exploded array of component parts, showing a split bushing for mounting in a bushing sleeve or boss on a truck, trailer or vehicular brake assembly according to an embodiment of carrying out the present invention.
Figure 2:
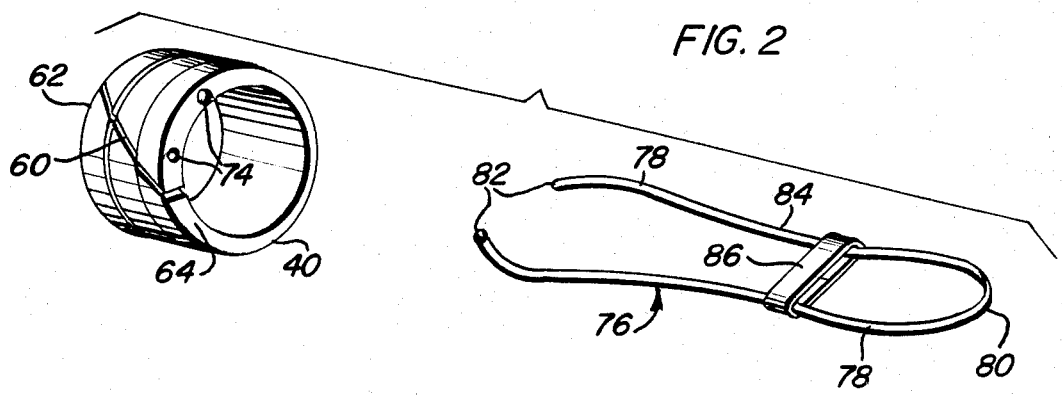
FIG. 2 is an enlarged perspective view of the split bushing and tool associated therewith forming a kit, the tool providing for insertion of the bushing by the tool and subsequent withdrawal of the split bushing after wear.
Figure 3:
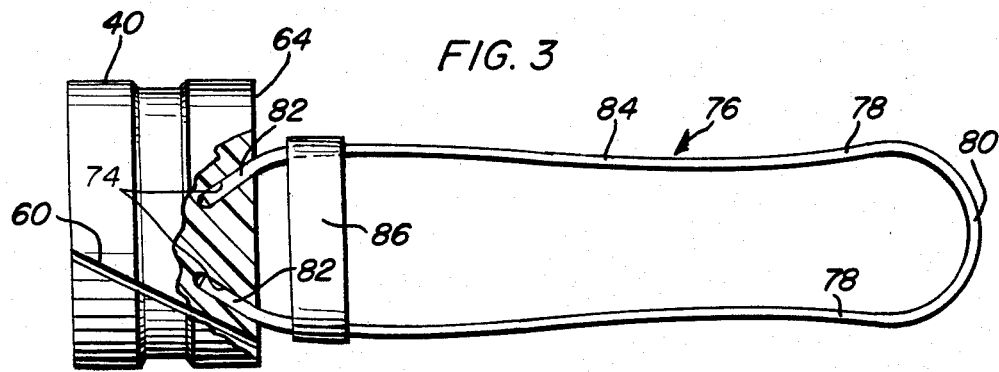
FIG. 3 is a plan view of the tool and split bushing partly fragmented to show the pinching-finger relation of the tool engaging pinching-finger receiving openings in the split bushing.

Referring now to the drawings, there is shown a portion of a vehicular brake assembly 10 including an axle housing 12 of the vehicle, a wheel mounting stub 14, and a backing plate 16 coupled to a flanged element 18 on the axle housing. Extending radially from the axle housing 12 is a support bracket 20 with a sleeve or boss 22 which together with housing 24 rigid with backing plate 16 and including a sleeve or boss 25 receives a camshaft 26 having an S-shaped cam 30 at one end for expanding brake shoe elements (not shown but of conventional construction) within the brake housing and behind the backing plate. The S-head camshaft 26 passes through and is rotatably journaled from boss 22 and boss 25 in housing 24.

Assembled on the cam shaft 26 are two bushings 40, oil seal elements 42, washers 44 and split spring retaining rings 46 which engage in snap relation into grooves 48 of the S-head cam shaft 26. A torque arm (not shown but usually driven by an air pressure device) applies torque to the inner end of the camshaft 26 by mounting on the splined end 50.

It is possible by the arrangement of the parts and components of the present invention to provide installation and replacement or removal of the bearing or bushing elements, such as bushings 40 which are constructed of plastic material which becomes more pliable when heated. This is accomplished due to the construction of the bushing in such a way that it possesses a skewed split cut 60 extending throughout from an end edge 62 of the bushing to an opposite end edge 64. In applying the bushing for installation or removal or replacement, the split cut 60 can be widened due to the inherent resiliency of the material from which it is formed with it being heated by immersion in hot water or the like, and it is then laterally installed, removed or replaced upon the shaft 26 about its mid or intermediate portion, then slid axially to the appropriate end section beyond the grooves 48 so that the bushing 40 is approximately in place over its working space 70. In performing this step, circumferentially spaced pinching-finger receiving openings 74 positioned in one end edge 64 of the bushing 40 are used. The bushing 46 can be opened up along the split cut 60, applied to the shaft 26 and slipped along the shaft back into the bushing sleeve or boss 22 or 25 so it is placed in position about its working space 70 on shaft 26. Similarly, on being worn out and on a need to take out the bushing, including for inspection purposes, the bushing 40 is withdrawn from the bushing sleeve or boss 22 or 25 by using openings 74 and then upon opening or widening the slit cut 60, the bushing is removed from its shaft 26.

A tool 76 is used to remove and install the bushing 40 and includes a U-shaped spring wire member having a pair of legs 78 interconnected by a curved bight portion 80 at one end and provided with a finger 82 at the other ends which converge towards each other for reception in the correspondingly converging openings or sockets 74 in bushing 40. The central portion of the legs 78 are inwardly bowed as at 84 and a sliding band or collar 86 is mounted on the bowed portions 84 in order to bias and retain the fingers 82 in the openings or sockets 74 thereby fixedly connecting the tool 76 to the bushing 40 thereby enabling axial movement of the bushing in relation to the shaft 26 and the bushing sleeve or boss 22 or 25. Also forming part of the present invention is the provision of a split in the washer and oil seal so that these elements can be replaced, if necessary, without disassembling the camshaft and related components thereby enabling replacement of a bushing or bushings in a very short time thus reducing the time period that the truck is out of service.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with vehicle brake operating mechanism including a shaft journaled from a pair of spaced supporting journals in the form of bosses each of which receives replaceable bushing, a longitudinally split bushing received in each boss and being axially inserted therein and removed therefrom by axial movement on the shaft, each bushing being constructed of plastic material sufficiently resilient and pliable when heated to enable the split bushing to be spread apart for lateral assembly of the bushing onto the shaft or lateral removal therefrom without removing the shaft from the bosses, a tool for connection with the end of the bushing for removing it axially from the boss, said bushing including a pair of axially converging sockets in an end edge thereof, said tool including a pair of converging fingers movable toward and away from each other to enable engagement with the sockets and means on the tool to retain the fingers in adjacent relations to lock them in the sockets thereby rigidly connecting the tool to the bushing, said sockets being in the form of inwardly converging blind bores communicating with the end edge of the bushing in circumferentially spaced relation to each other and with both sockets being on the same side of the longitudinal split in the bushing, said tool including a generally U-shaped wire member terminating in said inwardly converging fingers having the same angle of convergence as the sockets, said finger retaining means including a sliding band on the U-shaped wire member for movement toward the fingers when the fingers are engaged with the sockets thereby locking the fingers in the sockets with the tool extending axially of the bushing and parallel to the shaft for exerting axial force on the bushing when removing the bushing from the boss or inserting the bushing into the boss.

2. The combination as defined in claim 1 wherein said shaft forming part of the brake operating mechanism includes an S-shaped cam on one end thereof for operating the wheel brake mechanism and a spline coupling on the opposite end thereof for receiving a torque arm to oscillate the shaft, said split bushings being retained in the bosses by a removable split spring ring engaged in groove means in the shaft with removal of the spring rings enabling removable of a worn bushing and insertion of a new bushing in each of the bosses without removal of the shaft, the S-shaped cam or the torque arm thereby materially reducing the time required to replace a worn bushing in each of the bosses which support the brake operating shaft.

* * * * *